UNITED STATES PATENT OFFICE.

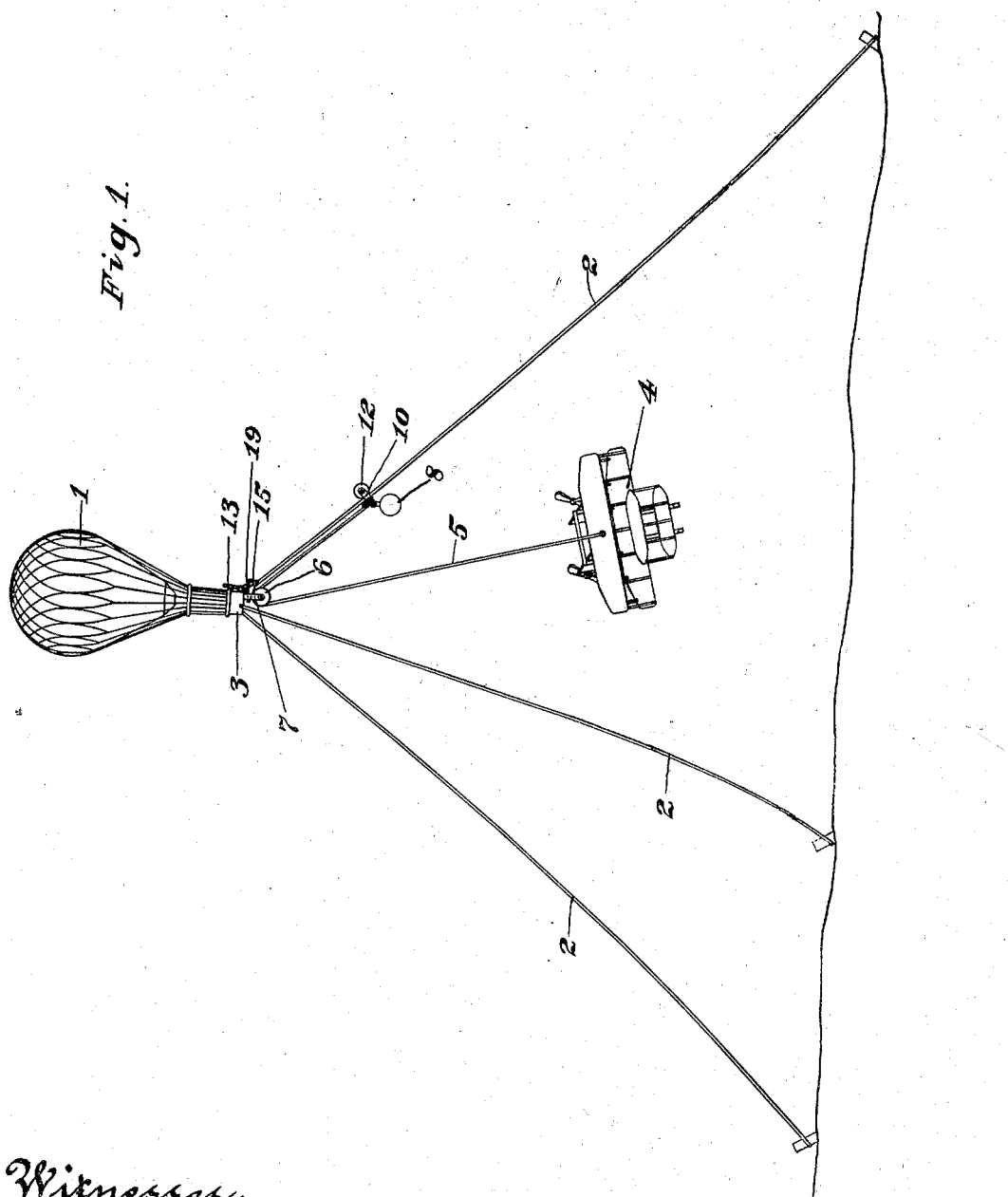

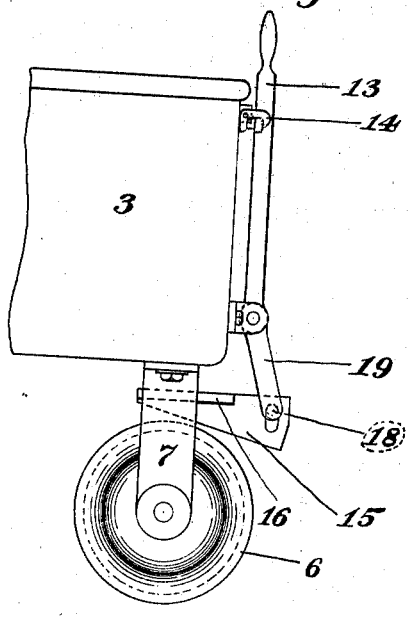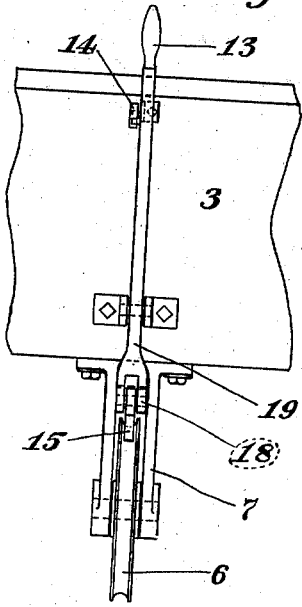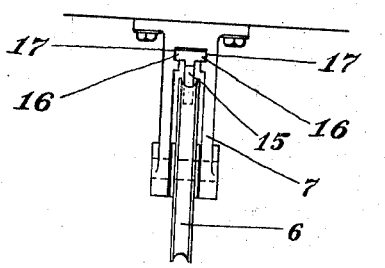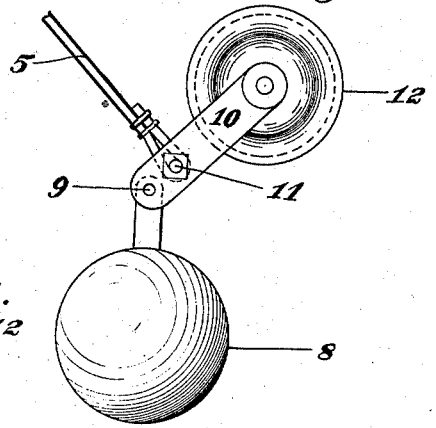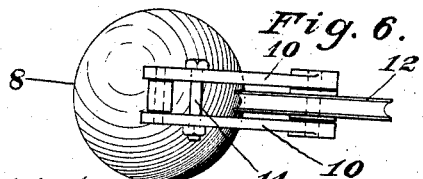

FREDERICK A. SCHLUETER, OF ST. LOUIS, MISSOURI.

AERONAUTIC SAFETY APPLIANCE.

967,571.

Specification of Letters Patent. Patented Aug. 16, 1910.

Application filed June 24, 1909. Serial No. 504,023.

*To all whom it may concern:*

Be it known that I, FREDERICK A. SCHLUETER, a citizen of the United States, residing at the city of St. Louis, State of Missouri, have invented certain new and useful Improvements in Aeronautic Safety Appliances, of which the following is a specification, reference being had therein to the accompanying drawings.

This invention consists in an aeronautic safety appliance especially adapted for the use of amateur aeronauts or others in experiments or trial trips with either standard apparatus or new devices.

Many are retarded from aeronautic trips and experiments by fear of falling to the ground through some defect in, or mishap to, the ordinary means of ascent, and, while old and tried apparatus or apparatus of approved and known characteristics may at any time get out of order so as unexpectedly to precipitate the aeronaut to the ground, yet the greatest danger lies in the trial of, and experiments with, new-style apparatus or devices. For experimentation with such new inventions, therefore, this present invention is particularly appropriate and valuable.

The main idea consists in the provision of a captive body capable of being supported by the atmosphere and the suspension therefrom of an experimental or other aeronautic device. While, specifically, the former is shown as a captive balloon and the latter as an aeroplane airship, and while this is the preferred embodiment of this invention, yet a captive airship may be substituted for the captive balloon, and, for the purposes of this invention, it is immaterial what may be the nature of the aeronautic device supported thereby.

In the accompanying drawings, like numbers of reference denote like parts wherever they occur, and Figure 1 is a side elevation; Fig. 2 is a side elevation of part of the basket of the captive balloon, showing a brake for governing the rate of descent of the suspended body; Fig. 3 is a front elevation of the same; Fig. 4 is a rear elevation thereof; Fig. 5 is a weight for taking up the slack of the suspending wire; and Fig. 6 is a top plan view of the same.

The captive balloon 1, or the like, is attached to the ground by a cable or cables 2, or other suitable means, which may be attached to the balloon in any desired manner, being shown in the drawings as attached to the basket 3 thereof. Said cables, while necessarily strong, need not be heavy. The airship 4 is suspended from the balloon, preferably the basket (if the captive suspending body be a balloon and if there be a basket), by a strong wire, cord, or the like 5 (such as piano wire, for instance), which may be attached to the airship in any desired manner and be provided with means for readily detaching same therefrom if desired. Said wire will preferably travel on roller 6 supported by casting 7 from basket 3, or other suitable point. Said wire or cord 5 is provided, adjacent to the end thereof opposite to the suspended body, with a weight 8, which is pivotally, or otherwise, attached, as at 9, to plate 10, said suspending wire or cord 5 being attached to said plate 10 by any suitable means, as, for instance, by bolt 11. Plate 10 is provided with a trolley 12, which runs on one of the guy-ropes 2. As the airship 4 rises, it tends to make the wire or cord 5 slack, but the pull of weight 8 causes trolley 12 to ride downward on its guy-rope 2, thus pulling wire 5 taut. When airship 4 descends, it pulls on wire 5, thereby causing trolley 12 to ride upward on its guy-rope toward the balloon.

A man will ordinarily be stationed in the basket 3. If the machinery of the airship should happen to get out of order, or other accident occur likely to result in the too-rapid descent to the ground of the airship 4, the man in the basket 3 will detach brake handle 13 from latch 14, and, by pushing outwardly on brake handle 13, cause wedge-shaped plate 15 to press wire 5 between it and roller 6, thus regulating the degree of rapidity with which the wire 5 can pass over roller 6, and thus regulating the rapidity of descent of the airship 4. The fins 16 on plate 15 fit in grooves 17 in casting 7, and serve as a guide for plate 15, which is pivoted at 18 to bell-crank lever 19, operated by brake handle 13.

With respect to the brake, weight, suspending, attaching, and detaching devices, it is obvious that many minor changes in the various parts may be made without departing from the nature and spirit of this invention, defined by the following claims.

I claim:

1. The combination, with a supporting aeronautic body, and means for holding the same captive, of a second aeronautic body, arranged to carry passengers, means connecting said bodies to support the second body from the first, and a connection between said connecting means and said holding means.

2. The combination with a supporting aeronautic body, and means for holding the same captive, of a second aeronautic body, arranged to carry passengers, means connecting said bodies to support the second body from the first, and a traveling connection between said connecting means and said holding means.

3. The combination, with a balloon and guy ropes for holding the same captive, of an aeronautic appliance arranged to carry passengers, means connecting said balloon and appliance, to support the latter from the former, and a trolley connected to said connecting means and arranged to travel along one of said guy ropes.

4. The combination with a passenger-carrying aeronautic appliance, of a passenger-carrying aeronautic appliance supported therefrom and arranged for independent movement with respect thereto, and means carried by the first appliance for controlling one of the movements of the second appliance.

5. The combination, with a captive passenger carrying aeronautic appliance, of an operable passenger carrying aeronautic appliance, means connecting said appliances to support the second appliance from the first, and means carried by the first appliance and associated with said connecting means for controlling one movement of the second appliance.

6. The combination with a captive and an operable aeronautic appliance, and a flexible connection between the same, of a brake carried by the captive appliance and arranged for engagement with said flexible connection to control one movement of the operable appliance.

7. The combination of a captive supporting balloon, an aeronautic appliance adapted to be supported thereby, supporting means connecting both of said bodies, and means on said first-mentioned body over which said supporting means is adapted to travel.

8. The combination of a captive supporting balloon, an aeronautic appliance adapted to be supported thereby, supporting means connecting both of said bodies, means on said first-mentioned body over which said supporting means is adapted to travel, and means for braking said supporting means.

9. The combination of a captive supporting balloon, an aeronautic appliance adapted to be supported thereby, supporting means connecting both of said bodies, means on said first-mentioned body over which said supporting means is adapted to travel, and means for taking up the slack in said supporting means.

10. The combination of a captive supporting balloon, an aeronautic appliance adapted to be supported thereby, supporting means connecting both of said bodies, means on said first-mentioned body over which said supporting means is adapted to travel, means for braking said supporting means, and means for taking up the slack in said means.

In testimony whereof I have affixed my signature in presence of two witnesses.

FREDERICK A. SCHLUETER.

Witnesses:
GLADYS WALTON,
GEORGE G. ANDERSON.